C. ALLES.
TRACTION WHEEL.
APPLICATION FILED MAY 17, 1921.
1,408,238.
Patented Feb. 28, 1922.
2 SHEETS—SHEET 1.
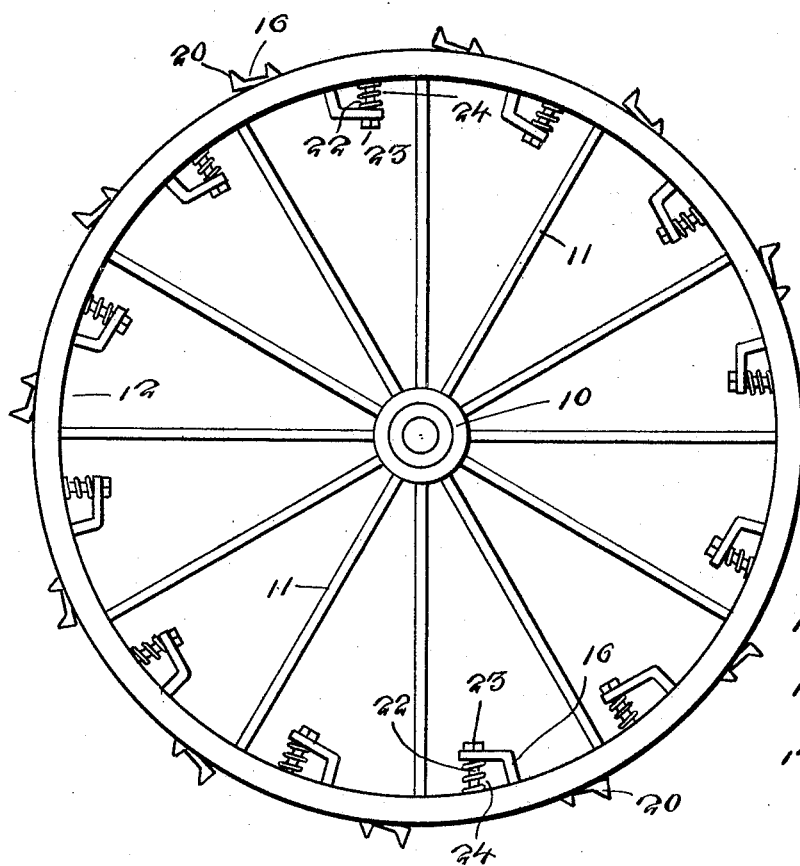
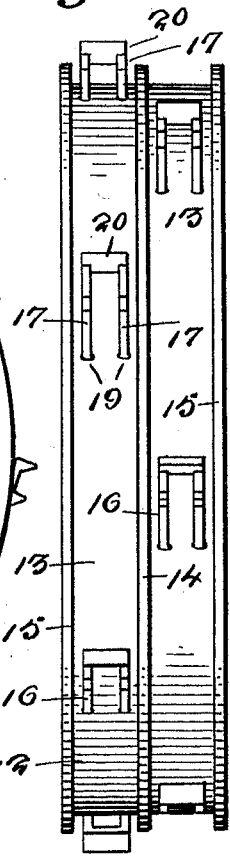
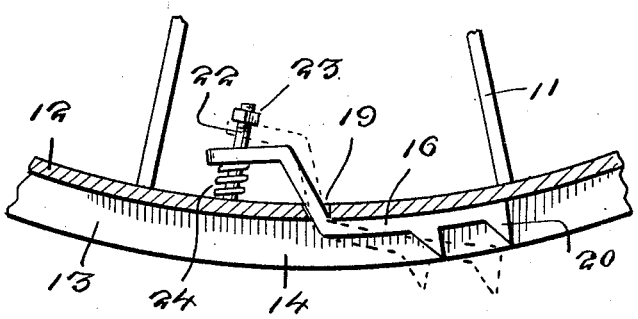
Conrad Alles
INVENTOR
BY Victor J. Evans
ATTORNEY
WITNESS:

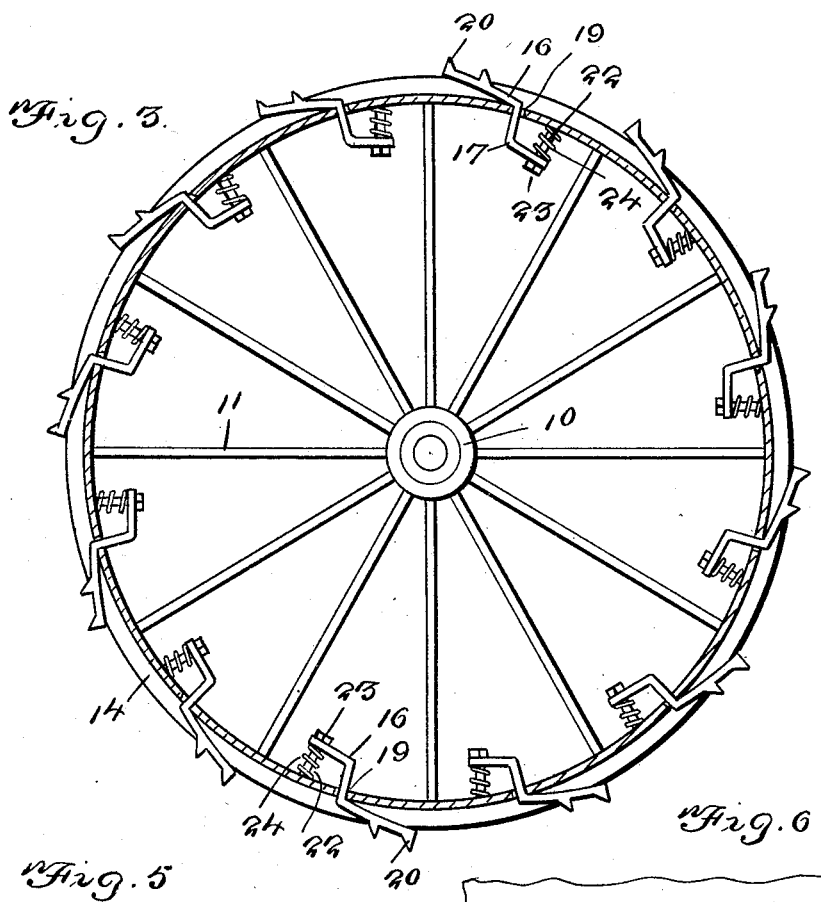
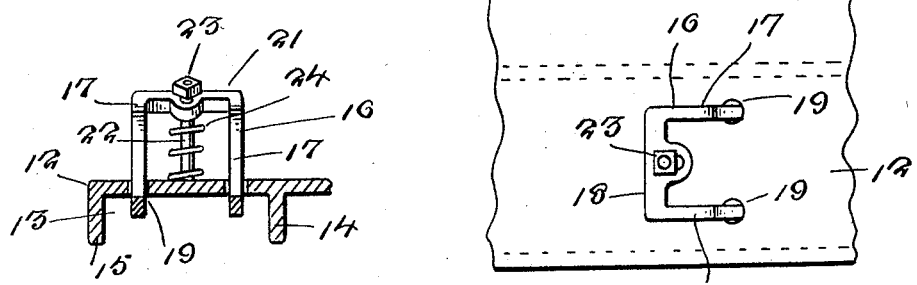
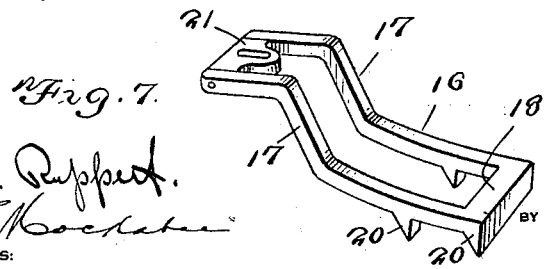

UNITED STATES PATENT OFFICE.

CONRAD ALLES, OF THREE RIVERS, CALIFORNIA.

TRACTION WHEEL.

1,408,238.　　　　　Specification of Letters Patent.　　Patented Feb. 28, 1922.

Application filed May 17, 1921. Serial No. 470,371.

*To all whom it may concern:*

Be it known that I, CONRAD ALLES, a citizen of the United States, residing at Three Rivers, in the county of Tulare and State of California, have invented new and useful Improvements in Traction Wheels, of which the following is a specification.

This invention relates to traction wheels and has for an object the provision of a wheel equipped with a plurality of traction elements or devices, arranged to grip the ground when the wheel is traveling over soft or muddy surfaces, but capable of being retracted or moved inwardly by contact with the ground when the wheel is traveling over hard surfaces so as to prevent injury to the traction devices or to the surface of the ground.

Another object of the invention is the provision of a traction wheel in which traction elements of novel formation are arranged around its periphery and mounted for yielding movement, the said movement being limited so that the said elements will grip the ground when necessary.

With the above and other objects in view, the invention further includes the following novel features and details of construction, to be hereinafter more fully described, illustrated in the accompanying drawings and pointed out in the appended claims.

In the drawings:—

Figure 1 is a side elevation of a traction wheel embodying the invention.

Figure 2 is an edge view of the same.

Figure 3 is a vertical sectional view taken longitudinally of the wheel rim.

Figure 4 is an enlarged fragmentary section showing by full lines the retracted position of one of the traction devices and by dotted lines its extended or ground engaging position.

Figure 5 is a transverse sectional view through the rim of the wheel taken on a line with the openings through which the traction device extends.

Figure 6 is a fragmentary plan view looking at the inside of the wheel rim and showing one of the traction devices.

Figure 7 is a detail perspective view of one of the traction devices.

Referring in detail to the drawings, wherein like characters of reference denote corresponding parts, the reference character 10 indicates the hub of a wheel, which is connected by means of spokes 11 with a rim 12. This rim is provided upon its outer periphery with annular channels 13, the latter being spaced apart by a flange 14, which together with the outside flanges 15 provide a tread for the wheel when the latter is traveling over hard or unyielding surfaces.

Carried by the rim 12 are traction devices 16 which are substantially Z-shaped in side view, but which include parallel arms 17, joined together at one end as indicated at 18. The arms 17 are spaced apart and extend through openings 19 provided in the annular channels 13, the portion of the arms lying within these channels being provided with gripping spurs or lugs 20, which are adapted to grip or dig into the surface of the ground when the wheel is traveling over soft or muddy roads. The opposite ends of the arms 17 are disposed within the inner periphery of the rim 12 and are connected by a transverse bar 21, through which extends a threaded pin or bolt 22, the latter having mounted thereon a nut 23 which forms a stop and limits the movement of the traction device in one direction. Surrounding the bolt 22 is a coiled spring 24, which is positioned between the inner periphery of the rim 12 and the bar 21, the said spring acting to force the inner end of the traction device inward and the outer end in an opposite direction so as to project the spurs 20 beyond the periphery of the said rim. The traction devices are thus permitted a limited pivotal movement, and due to their position within the openings 19 when traveling over hard or unyielding surfaces, the said traction elements will be forced inwardly within the outer periphery of the wheel and thus prevent injury either to the said elements or to the road. When the wheel is traveling over soft or muddy surfaces, the spurs will be normally projected beyond the outer periphery of the wheel so as to engage the ground, and their inner movement will be limited through the engagement of the said devices with the walls of the channels 13. The devices are preferably arranged centrally of the channels 13 in staggered relation as shown in the drawings.

The invention is susceptible of various changes in its form, proportions and minor details of construction and the right is herein reserved to make such changes as properly fall within the scope of the appended claims.

Having described the invention what is claimed is:—

1. A traction wheel embodying a rim, an annular channel extending around the periphery of the rim, substantially rectangular frames extending through said rim into said channel, ground engaging spurs extending from said frames and means engageable with the inner ends of the frames to yieldingly project the spurs beyond the outer edges of the channel.

2. A traction wheel embodying a rim, an annular channel extending around the periphery of the rim and traction elements arranged within said channel, said elements embodying substantially Z-shaped members extending through openings formed in the wheel, spurs extending from the outer ends of said elements and means connected to the inner ends of the traction elements for yieldingly forcing the spurs into engagement with the ground.

3. A traction wheel embodying a rim, an annular channel extending around the periphery of the rim, traction elements arranged within said channel, substantially Z-shaped members extending through openings formed in the wheel, spurs extending from the outer ends of said elements and means connected to the inner ends of the traction elements for yieldingly forcing the spurs into engagement with the ground and means whereby the said yielding means may be adjusted to limit the outward movement of the traction elements.

In testimony whereof I affix my signature.

CONRAD ALLES.